US012561470B2

(12) United States Patent
Min et al.

(10) Patent No.: US 12,561,470 B2
(45) Date of Patent: Feb. 24, 2026

(54) DATA PROTECTION VIA ATTRIBUTES-BASED AGGREGATION

(71) Applicant: EQUIFAX INC., Atlanta, GA (US)

(72) Inventors: Xinyu Min, Decatur, GA (US); Rupesh Ramanlal Patel, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 657 days.

(21) Appl. No.: 17/595,153

(22) PCT Filed: May 13, 2020

(86) PCT No.: PCT/US2020/032695
    § 371 (c)(1),
    (2) Date: Nov. 10, 2021

(87) PCT Pub. No.: WO2020/232137
    PCT Pub. Date: Nov. 19, 2020

(65) Prior Publication Data
    US 2022/0222368 A1     Jul. 14, 2022

Related U.S. Application Data

(60) Provisional application No. 62/847,557, filed on May 14, 2019.

(51) Int. Cl.
    *G06F 21/62* (2013.01)
    *G06F 21/60* (2013.01)
    *G06N 20/00* (2019.01)

(52) U.S. Cl.
    CPC ........ *G06F 21/6227* (2013.01); *G06F 21/602* (2013.01); *G06F 21/6245* (2013.01); *G06N 20/00* (2019.01)

(58) Field of Classification Search
    CPC .. G06F 21/6245; G06F 21/6218; G06F 16/93; G06F 21/6254; G06F 16/35; G06F 21/6227
    See application file for complete search history.

(56) References Cited

U.S. PATENT DOCUMENTS

| 11,018,959 B1 * | 5/2021 | Neill | ..................... H04L 43/026 |
| 11,024,299 B1 * | 6/2021 | Drake | .................. G10L 15/197 |

(Continued)

FOREIGN PATENT DOCUMENTS

| WO | 2014031041 A1 | 2/2014 | |
| WO | WO-2019089439 A1 * | 5/2019 | ......... G06F 21/6218 |

OTHER PUBLICATIONS

Fiscayo Caleb Sangogboye et al., "A Framework for Privacy-Preserving Data Publishing with Enhanced Utility for Cyber-Physical Systems," Nov. 2018, ACM Transactions on Sensor Networks, vol. 14, No. 3-4, Article 30. (Year: 2018).*

(Continued)

*Primary Examiner* — Tae K Kim
(74) *Attorney, Agent, or Firm* — Kilpatrick Townsend & Stockton LLP

(57) ABSTRACT

Systems and methods for obfuscating sensitive data by aggregating the data based on data attributes are provided. Each sensitive data record contains at least one sensitive attribute. A data protection system generates a data transformation model based on the sensitive data records and transforms the sensitive data records using the data transformation model. The data protection system further compresses the sensitive database by grouping the sensitive data records into aggregation segments based on the transformed sensitive data records. The data protection system generates aggregated data by calculating statistics for the at least one sensitive attribute contained in the sensitive data records in each of the aggregation segments. The aggregated data can be made accessible by client computing devices that are unauthorized to access the sensitive data records.

20 Claims, 5 Drawing Sheets

(56)          References Cited

U.S. PATENT DOCUMENTS

| | | | |
|---|---|---|---|
| 11,461,690 B2 * | 10/2022 | Szeto | G06N 20/10 |
| 11,582,240 B1 * | 2/2023 | Bhatt | G06F 21/6245 |
| 11,983,200 B2 * | 5/2024 | Hirate | G06Q 30/0201 |
| 2007/0150724 A1 * | 6/2007 | Lin | G06F 21/6218 |
| | | | 713/155 |
| 2007/0226039 A1 * | 9/2007 | Chu | G06Q 30/02 |
| | | | 705/7.33 |
| 2008/0118150 A1 | 5/2008 | Balakrishnan et al. | |
| 2010/0169332 A1 * | 7/2010 | Bezzi | G06F 16/24 |
| | | | 707/758 |
| 2011/0270837 A1 * | 11/2011 | Raj | G06F 21/6227 |
| | | | 707/805 |
| 2011/0277037 A1 | 11/2011 | Burke et al. | |
| 2014/0304821 A1 * | 10/2014 | Chari | G06F 21/577 |
| | | | 726/25 |
| 2015/0324607 A1 | 11/2015 | Mushkatblat et al. | |
| 2017/0169253 A1 | 6/2017 | Curcio et al. | |
| 2018/0097759 A1 * | 4/2018 | Brechbuhl | G06F 16/24578 |
| 2018/0218171 A1 * | 8/2018 | Bellala | G06F 21/6254 |
| 2018/0330275 A1 * | 11/2018 | Jain | G06N 5/04 |
| 2019/0179925 A1 * | 6/2019 | Meron | G06F 16/211 |
| 2019/0347428 A1 * | 11/2019 | Youssefi | G06N 20/00 |
| 2020/0242466 A1 * | 7/2020 | Mohassel | G06F 21/6254 |
| 2020/0265155 A1 * | 8/2020 | Dong | G06F 21/6218 |
| 2020/0311304 A1 * | 10/2020 | Parthasarathy | G06F 11/3006 |
| 2021/0209247 A1 * | 7/2021 | Mohassel | A63B 21/023 |
| 2022/0050921 A1 * | 2/2022 | LaFever | H04L 63/20 |

OTHER PUBLICATIONS

Aggarwal, et al., "Introduction to Cluster Analysis", Data Clustering: Algorithms and Application, Aug. 21, 2013, pp. 1-28.

Ilavarasi, et al., "An Evolutionary Feature Set Decomposition Based Anonymization for Classification Workloads: Privacy Preserving Data Mining", Cluster Computing, vol. 20, No. 4, Aug. 30, 2017, pp. 3515-3525.

International Application No. PCT/US2020/032695, "International Search Report and Written Opinion", Aug. 7, 2020, 18 pages.

Sangogboye, et al., "A Framework for Privacy-Preserving Data Publishing with Enhanced Utility for Cyber-Physical Systems", ACM Transactions on Sensor Networks, vol. 14, No. 3-4, Nov. 27, 2018, pp. 1-22.

Canadian Application No. CA3,139,144, Office Action, Mailed on Oct. 29, 2024, 6 pages.

European Application No. EP20729544.5, Office Action, Mailed on Jun. 16, 2025, 5 pages.

Australian Application No. AU2020274349, "Second Examination Report", Oct. 8, 2025, 3 pages.

* cited by examiner

200

RECEIVE A REQUEST FOR DATA        202

DETERMINE DATA TRANSFORMATION AND GENERATE TRANSFORMED SENSITIVE DATA        204

COMPRESS SENSITIVE DATABASE BY GROUPING TRANSFORMED DATA RECORDS INTO DATA SEGMENTS        206

GENERATE AGGREGATED DATA BY CALCULATING STATISTICS OF SENSITIVE ATTRIBUTES IN EACH DATA SEGMENT        208

PROVIDE THE AGGREGATED DATABASE FOR ACCESS        210

END

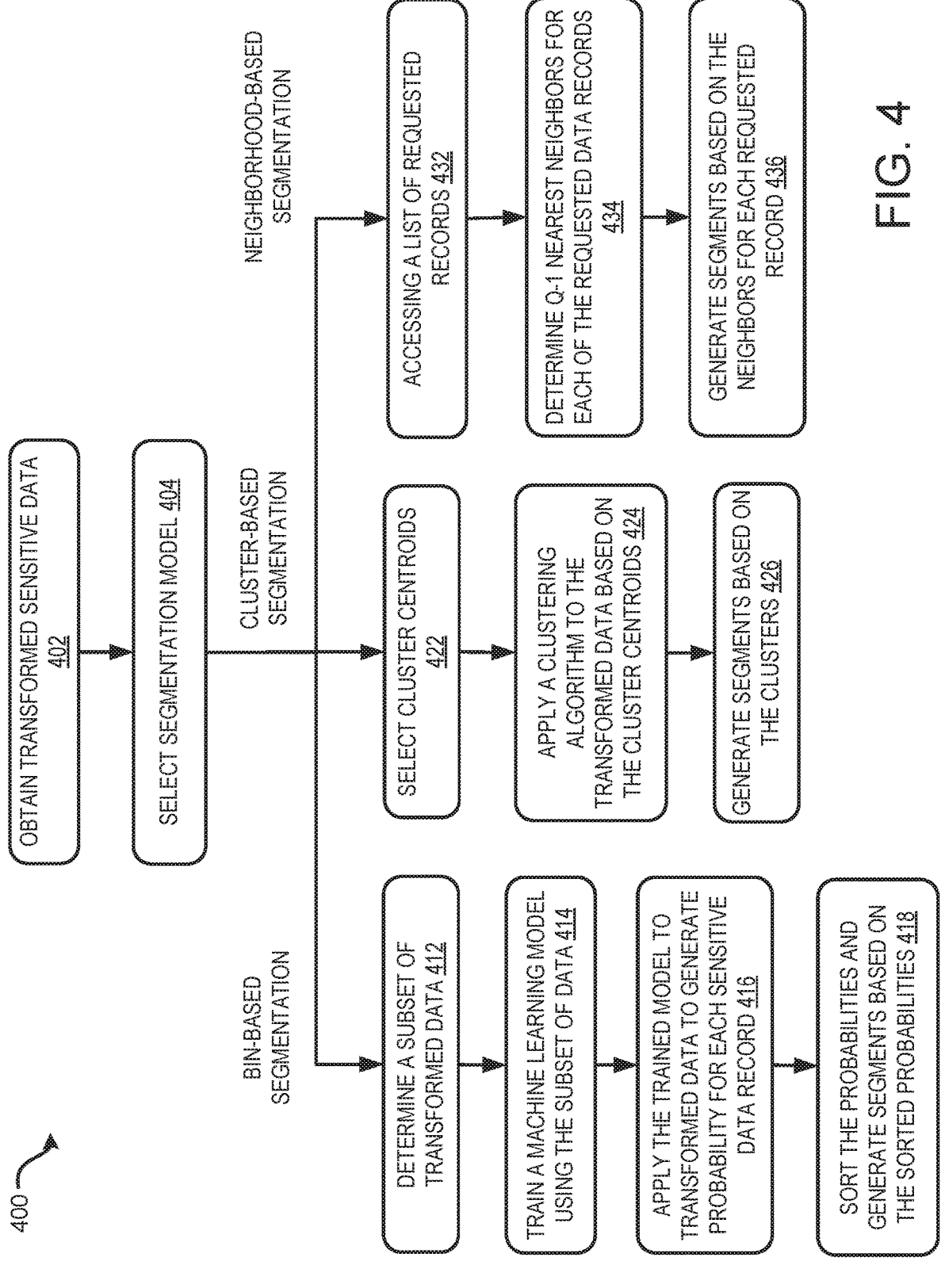

OBTAIN TRANSFORMED SENSITIVE DATA 402

SELECT SEGMENTATION MODEL 404

NEIGHBORHOOD-BASED SEGMENTATION

ACCESSING A LIST OF REQUESTED RECORDS 432

DETERMINE Q-1 NEAREST NEIGHBORS FOR EACH OF THE REQUESTED DATA RECORDS 434

GENERATE SEGMENTS BASED ON THE NEIGHBORS FOR EACH REQUESTED RECORD 436

CLUSTER-BASED SEGMENTATION

SELECT CLUSTER CENTROIDS 422

APPLY A CLUSTERING ALGORITHM TO THE TRANSFORMED DATA BASED ON THE CLUSTER CENTROIDS 424

GENERATE SEGMENTS BASED ON THE CLUSTERS 426

BIN-BASED SEGMENTATION

DETERMINE A SUBSET OF TRANSFORMED DATA 412

TRAIN A MACHINE LEARNING MODEL USING THE SUBSET OF DATA 414

APPLY THE TRAINED MODEL TO TRANSFORMED DATA TO GENERATE PROBABILITY FOR EACH SENSITIVE DATA RECORD 416

SORT THE PROBABILITIES AND GENERATE SEGMENTS BASED ON THE SORTED PROBABILITIES 418

DATA PROTECTION VIA ATTRIBUTES-BASED AGGREGATION

CROSS REFERENCE TO RELATED APPLICATIONS

This claims priority to U.S. Provisional Application No. 62/847,557, entitled "Data Protection via Attributes-Based Aggregation," filed on May 14, 2019, which is hereby incorporated in its entirety by this reference.

TECHNICAL FIELD

The present disclosure relates generally to data integrity and protection. More specifically, but not by way of limitation, this disclosure relates to facilitating secure queries and other use of stored data via aggregation-based data obfuscation.

BACKGROUND

Protecting data from unauthorized access is an important aspect of computer security, especially in the Internet age. As network connections become ubiquitous, more and more data and services are stored and provided online so that the data and services can be accessed instantly and conveniently. However, maintaining the security of this data is often difficult, if not impossible, when using a computing system that is connected to the Internet. Sensitive data, such as data containing identity information about individuals like customers or patients, are one of the major targets of the cyberattacks where attackers try to access, copy, or even modify the sensitive data stored on a computer.

SUMMARY

Various aspects of the present disclosure involve obfuscating sensitive data by aggregating the sensitive data based on data attributes. In one example, a query is received from a client computing device for a sensitive database stored in a secured storage device that the client computing device is unauthorized to access. The sensitive database includes multiple sensitive data records and each sensitive data record contains at least one sensitive attribute. A data protection system can transform the sensitive data records using a data transformation model that is generated based on the sensitive data records. The data protection system further compresses the sensitive database by grouping the sensitive data records into multiple aggregation segments based on the transformed sensitive data records. Each of the aggregation segments contains multiple sensitive data records. The data protection system generates aggregated data by calculating statistics for the at least one sensitive attribute contained in the sensitive data records in each of the aggregation segments. The aggregated data can be made accessible by the client computing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

FIG. 4 is a flowchart showing an example of a process for generating data segments for the sensitive data, according to certain aspects of the present disclosure.

DETAILED DESCRIPTION

Figure 1:
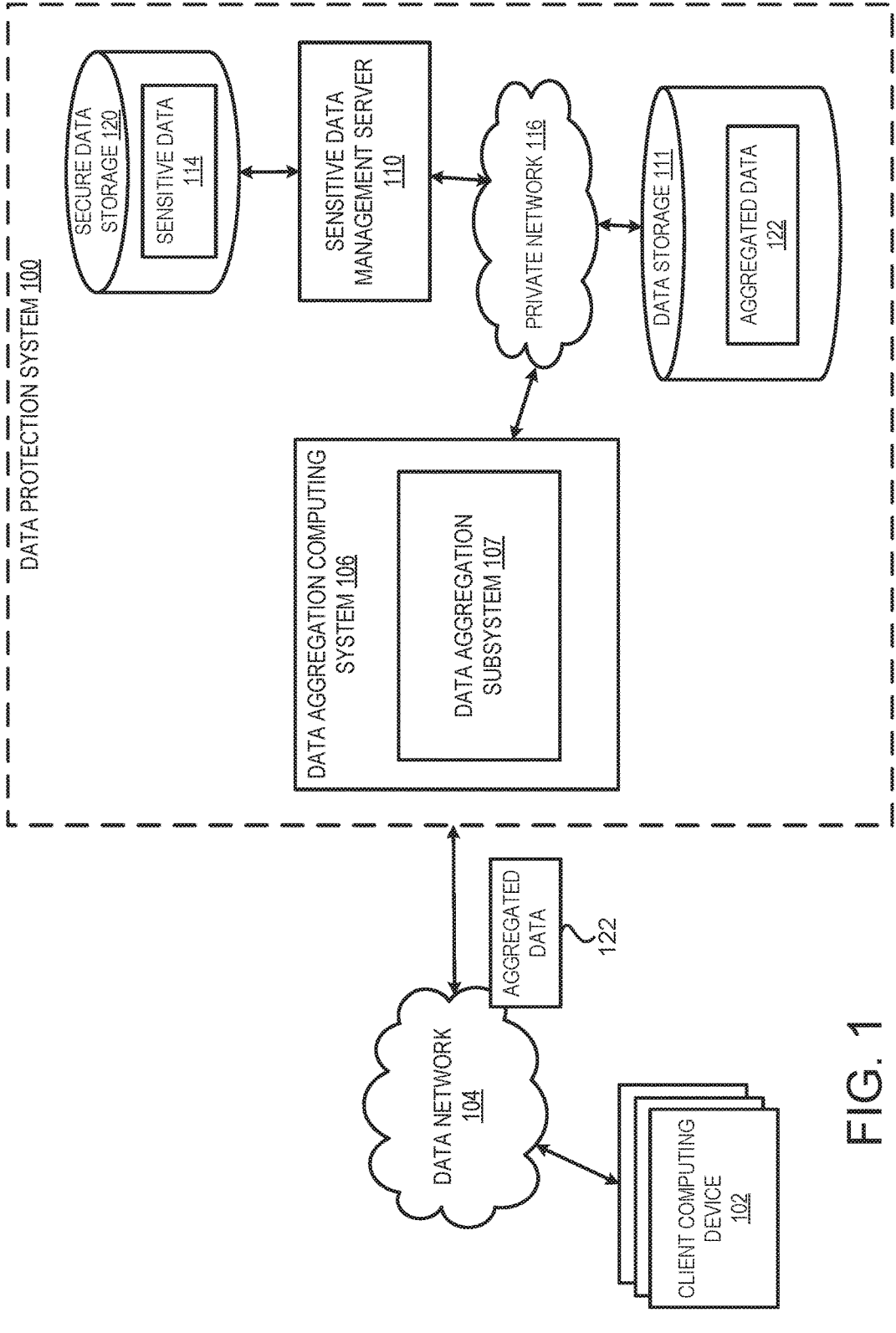
FIG. 1 is a block diagram depicting an example of a data protection system that can provide data protection through aggregation-based data obfuscation, according to certain aspects of the present disclosure.

Certain aspects of this disclosure involve obfuscating sensitive data by aggregating the data based on data attributes. A data protection system can determine a data transformation for the sensitive data to transform the sensitive data into transformed sensitive data. The transformation allows the segmentation of the sensitive data to be performed more accurately. The transformation model can be determined based on factors such as the size of the sensitive data, the targeted use of the aggregated data, and so on. For example, if the targeted use of the aggregated data is known, the data transformation model can be constructed so that the attributes of the sensitive data affecting a performance indicator in the targeted use are assigned higher weights than other attributes.

The transformed sensitive data can be further compressed by grouping or segmenting transformed data records into data segments. The grouping or segmenting is performed such that sensitive data in the same segment have similar attributes and performance, and sensitive data in different segments have dissimilar attributes and performance. The segmentation can be performed using, for example, a bin-based segmentation model, a cluster-based segmentation model, or a neighborhood-based segmentation model. The data protection system can remove sensitive information from the sensitive data records based on the segmentation to generate aggregated data. For example, the sensitive information can be removed by calculating statistics for each attribute of the sensitive data records contained in a data segment. The calculated statistics can be stored in an aggregated data record as obfuscated attributes. In this way, the individual values of the attributes of the sensitive data records are not revealed in the aggregated data.

In some aspects, the aggregated data preserve some of the characteristics of the sensitive data, such as the value range and value distribution of the sensitive data attributes. As such, the aggregated data can be utilized to offer rapid access to the data by entities requesting the data. The sensitive data, on the other hand, can be stored in a highly secured environment, such as with a high complexity encryption mechanism, within a highly secured network environment, or even be taken offline when necessary. This significantly reduces the risk of the sensitive data being attacked and compromised through cyberattacks without much impact on the accessibility of the data. In addition, the aggregated data have a size smaller than the sensitive data. Transmitting and processing the aggregated data can reduce the consumption of network bandwidth and computing resources, such as CPU time and memory space. Furthermore, by obfuscating the sensitive data through aggregation, more data can be made available to entities that otherwise do not have the authorization to access the sensitive data. These data can be valuable in applications such as data analysis, building, and training analysis models where the accuracy of the analysis and the model can be increased due to more data offered through the obfuscation.

These illustrative examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

Operating Environment Example for Data Obfuscation Based on Aggregation

Referring now to the drawings, FIG. 1 depicts an example of a data protection system 100 that can provide data protection through aggregation-based data obfuscation. FIG. 1 depicts examples of hardware components according to some aspects. The data protection system 100 is a specialized computing system that may be used for processing large amounts of data using a large number of computer processing cycles. The data protection system 100 may include a data aggregation computing system 106 which may be a specialized computer, server, or other machines that processes data received or stored within the data protection system 100. The data aggregation computing system 106 may include one or more other systems. For example, the data aggregation computing system 106 may include a database system for accessing network-attached data stores, a communications grid, or both. A communications grid may be a grid-based computing system for processing large amounts of data. The data protection system 100 may also include network-attached data storage 111 for storing the aggregated data 122. In some aspects, the network-attached data storage can also store any intermediate or final data generated by one or more components of the data protection system 100.

In the example of FIG. 1, the data protection system 100 also includes a secure data storage 120 for storing sensitive data 114 in a sensitive database. The sensitive database may contain sensitive data that are protected against unauthorized disclosure. Protection of sensitive data may be required for legal reasons, for issues related to personal privacy or for proprietary considerations. For example, the sensitive data 114 may contain regulated data. The regulated data can include credit information for specific persons and may include government identification numbers, a customer identifier for each person, addresses, and credit attributes such as mortgage or other loan attributes. Such information is referred to as "regulated" because the distribution and use of this information are restricted by law. As an example, if an institution uses regulated information to market a credit product, the marketing must take the form of a firm offer of credit. The sensitive data may also include linking keys for individual credit files.

Through obfuscation, sensitive data can be transformed into non-sensitive data, such as aggregated data 122. For example, aggregated data 122 can be generated by combining individual sensitive attributes in the sensitive data 114 beyond the point where information about specific sensitive data records can be obtained from the combined data. To achieve this, a data aggregation subsystem 107 can be employed by the data aggregation computing system 106 to perform the aggregation operations. For example, the data aggregation subsystem 107 can group data into multiple data segments, and the aggregated data 122 can be generated by combining the attributes of the data in each data segment, such as by calculating the statistics of attributes. In one example, the segmentation is performed such that sensitive data in the same segment have similar attributes and performance, and sensitive data in different segments have dissimilar attributes and performance. In some examples, similarity between two sensitive data records can be defined as the inverse of the distance between these two sensitive data records. In this way, individual values of the attributes of the sensitive data 114 are not revealed, yet the characteristics of the sensitive data (such as the value range of sensitive data attributes, and the distribution of the sensitive data attributes) are preserved.

Because the aggregated data 122 has been obfuscated and no longer contains information that is specific to any of the individuals, the aggregated data 122 are not subject to the same restrictions as the sensitive data 114. In the above example involving regulated data, the aggregated data 122 can be referred to as "unregulated" data, and institutions can use unregulated data more freely to market products, for example, to generate mere invitations to apply for a credit product.

The data aggregation computing system 106 can include one or more processing devices that execute program code. In some aspects, these processing devices include multi-threading-capable processors that are implemented in multiple processing cores. The program code, which is stored on a non-transitory computer-readable storage medium, can include the data aggregation subsystem 107. The data aggregation subsystem 107 can perform the aggregation process described herein by distributing the task among multiple computing processes on the multiple cores and/or the multiple threads of a process. The output of each computing process can be stored as intermediate results on the data storage 111. The intermediate results can be aggregated into the aggregated data 122 if the processing of all the threads or processes is complete.

The sensitive data 114 can be stored in the secure data storage 120 in a highly secured manner. For example, the sensitive data 114 can be encrypted using highly secure encryption operation, increasing the difficulty posed to attackers that seek to access the plain sensitive data 114. For instance, the sensitive data 114 can be encrypted using advanced encryption standard methods by setting the keys to be 128-, 192-, or 256-bit long. The encryption can also be performed using the triple data encryption standard method with a 56-bit key.

In addition, the sensitive data 114 can be stored in an isolated network environment that is accessible only through a sensitive data management server 110. The sensitive data management server 110 may be a specialized computer, server, or other machine that is configured to manage the encryption, decryption, and access of the sensitive data 114. A request for the sensitive data 114 is received at the sensitive data management server 110. The sensitive data management server 110 may perform authentication to determine the identity of the requesting entity, such as through the credentials of the requesting entity, and/or the authority associated with the requesting entity regarding accessing the sensitive data 114. The sensitive data management server 110 may also be configured to set the sensitive database offline from time to time to further reduce the risk of the sensitive data 114 being compromised through cyberattacks via a network.

Furthermore, the sensitive data management server 110, the data aggregation computing system 106 and the data storage 111 can communicate with each other via a private network 116. In some aspects, by using the private network 116, the aggregated data stored in the data storage 111 can also be stored in an isolated network (i.e., the private network 116) that has no direct accessibility via the Internet or another public data network 104.

One or more entities can transmit requests for data using one or more client computing devices 102. A client computing device 102 may be a server computer, a personal computer ("PC"), a desktop workstation, a laptop, a notebook, a smartphone, a wearable computing device, or any other computing device capable of connecting to the data network 104 and communicating with the data aggregation computing system 106 or other systems in the data protection system 100. The data network 104 may be a local area network ("LAN"), a wide-area network ("WAN"), the Internet, or any other networking topology known in the art that connects the client computing device 102 to the data protection system 100. The data networks 104 can be incorporated entirely within (or can include) an intranet, an extranet, or a combination thereof.

The data protection system 100 can send the aggregated data 122 in response to the data request from the client computing device 102. In some aspects, even if the requesting entity is not authorized to access the sensitive data 114, the requesting entity may receive the aggregated data 122 because the aggregated data 122 no longer contain sensitive information that is specific to any individual sensitive data record. The aggregated data 122 may be generated in response to receiving the request. Alternatively, or additionally, the aggregated data 122 may be generated and stored in the data storage 111 and utilized to serve the requests as they are received.

If a requesting entity determines that the received aggregated data 122 are insufficient, the requesting entity can submit a request for the sensitive data 114, or at least a portion thereof, if the requesting entity is authorized to access the sensitive data 114. In such a scenario, the data protection system 100 can forward the request along with the credentials of the requesting entity to the sensitive data management server 110 to retrieve the sensitive data 114.

Network-attached data stores used in the data protection system 100 may also store a variety of different types of data organized in a variety of different ways and from a variety of different sources. For example, network-attached data stores may include storage other than primary storage located within the data aggregation computing system 106 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

The numbers of devices depicted in FIG. 1 are provided for illustrative purposes. Different numbers of devices may be used. For example, while each device, server, and system in FIG. 1 is shown as a single device, multiple devices may instead be used. Also, devices and entities may be combined or partially combined. For example, the data aggregation computing system 106 and the data storage 111 may overlap or reside on a single server. Each communication within the data protection system 100 may occur over one or more data networks 116, which may include one or more of a variety of different types of networks, including a wireless network, a wired network, or a combination of a wired and wireless network. A wireless network may include a wireless interface or a combination of wireless interfaces. A wired network may include a wired interface. The wired or wireless networks may be implemented using routers, access points, bridges, gateways, or the like, to connect devices in the private network 116.

Figure 2:
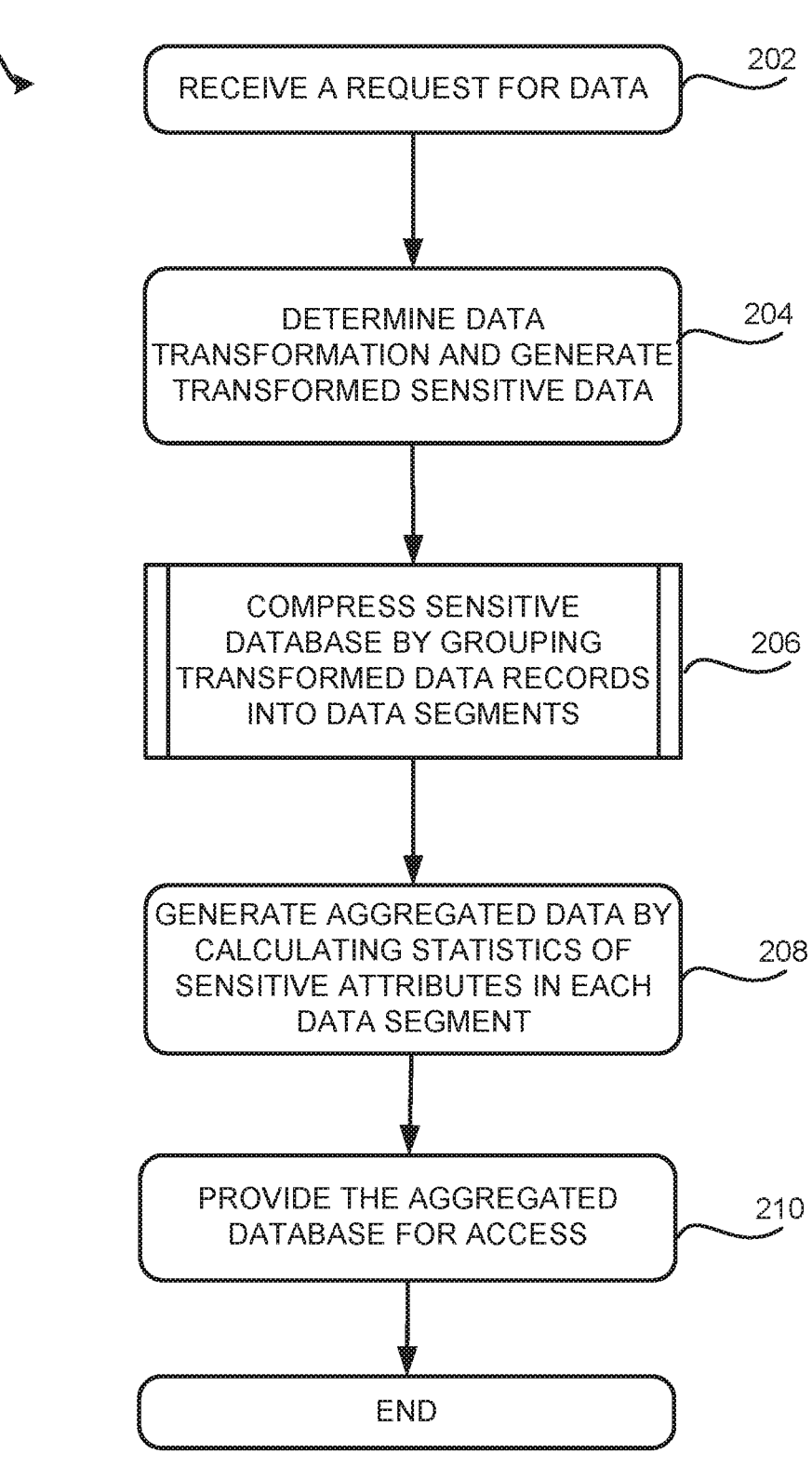
FIG. 2 is a flowchart illustrating an example of a process for utilizing data aggregation to obfuscate sensitive data, according to certain aspects of the present disclosure.

Examples of Computer-Implemented Operations for Data Obfuscation Based on Aggregation FIG. 2 is a flowchart depicting an example of a process 200 for utilizing data aggregation to obfuscate sensitive data to satisfy data requests. One or more computing devices (e.g., the data protection system 100 or, more specifically, the data aggregation computing system 106) implement operations depicted in FIG. 2 by executing suitable program code (e.g., the data program code for the data aggregation subsystem 107). The aggregation may be performed using multi-computing process distribution, or process distribution among multiple computing processes, at least one of which makes use of multi-threading, multiple processing core distribution, or both. For illustrative purposes, the process 200 is described with reference to certain examples depicted in the figures. Other implementations, however, are possible.

At block 202, the process 200 involves receiving a request for data from a client computing device associated with a requesting entity. The request can include an identification of the data requested or a search query requesting data that satisfy the search query. The requesting entity may be an entity authorized to access the sensitive data 114 or an entity that is not authorized to access the sensitive data 114 but is authorized to access the aggregated data 122.

At block 204, the process 200 involves determining a data transformation for the sensitive data 114 and generating transformed sensitive data based on the data transformation. The data transformation can be used to transform the sensitive data 114 and thereby allow the segmentation to be performed more accurately.

Figure 3:
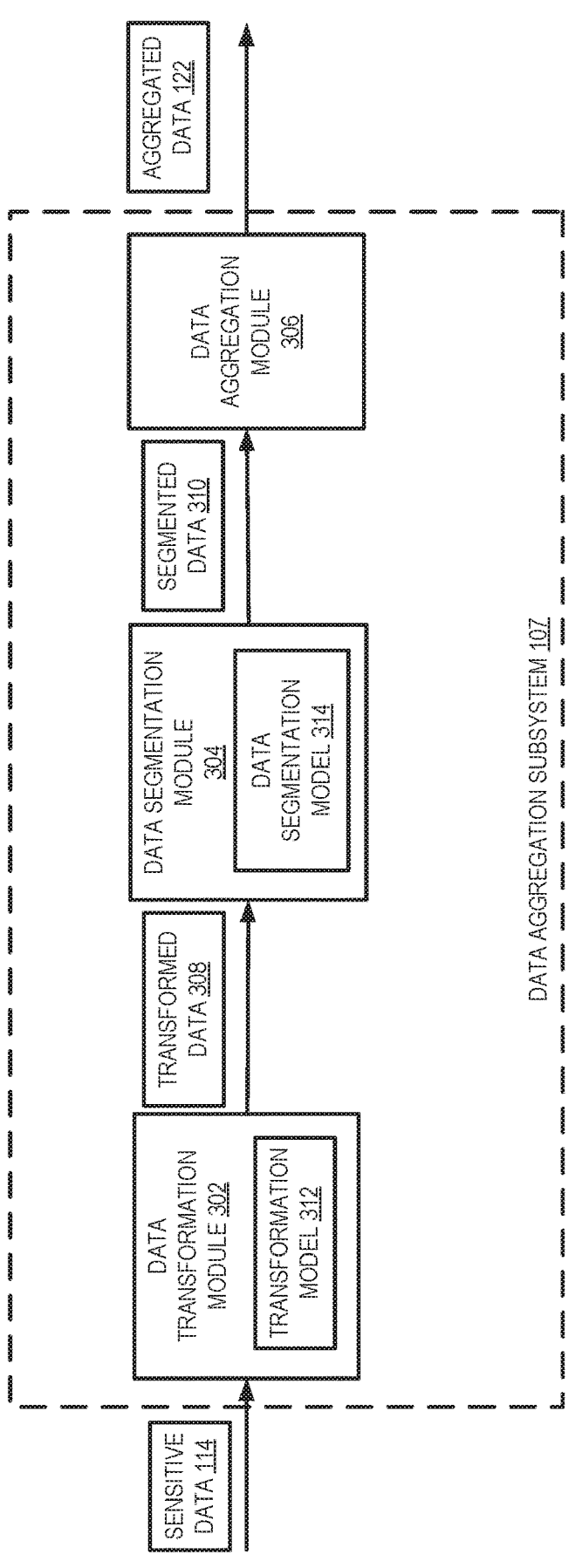
FIG. 3 is a block diagram depicting examples of components of the data aggregation subsystem, according to certain aspects of the present disclosure.

In one example, the data transformation is performed by a data transformation module 302 of the data aggregation subsystem 107 as shown in FIG. 3. The data transformation module 302 includes program code that is executable by processing hardware. The data transformation module 302, when executed, can cause the processing hardware to determine a data transformation model 312 for transforming the sensitive data 114. A data transformation model 312 transforms input data from one space (e.g., a space defined using the Euclidean distance) into a different space (e.g., a space defined using another type of distance, such as the Mahalanobis distance). The data transformation model 312 can a linear model or a non-linear model. The data transformation model 312 can be determined based on factors such as the size of the sensitive data 114, a performance indicator for targeted use of the aggregated data 122, and so on.

For example, the targeted use of the aggregated data 122 is known in some scenarios, such as being specified in the data request and can thus be utilized to determine the data transformation model 312. For instance, the request for data may specify that the targeted use of the aggregated data 122 is to identify consumers who are likely to open a bank card in the next three months. Based on such a targeted use, the data transformation module 302 can determine the data transformation model 312 so that the attributes of the sensitive data 114 affecting the consumer's likelihood of opening a bank card in the next three months are assigned greater weights than other attributes when determining the transformation. In one implementation, metric learning algorithms such as the large margin nearest neighbor (LMNN), information theoretic metric learning (ITML), or Mahalanobis metric for clustering (MMC) is utilized to determine the data transformation model 312 based on the targeted use.

For example, LMNN method can be utilized to learn a Mahanalobis distance metric in the k-Nearest Neighbor classification setting using semidefinite programming. The learned metric is optimized in the purpose of keeping neighbor data points in the same class, while keeping data points from different classes separated by a large margin. The LMNN method is implemented by solving the following optimization problem:

$$\min_{A \succcurlyeq 0} \sum_{(i,j) \in S} d_A(x_i, x_i) + \lambda \sum_{(i,j,k) \in R} [1 + d_A(x_i, x_i) - d_A(x_i, x_k)]_+.$$

Where A is the Mahanalobis distance metric; x represents data points; d represents the distance function; S represents the set of data points belong to the same class; R represents the set of all triples (i,j,k), in which $x_i$ and $x_j$ are neighbors within the same class, while $x_k$ belongs to a different class; $\lambda$ is the Lagrange multiplier, which is a hyper-parameter. The goal is that a given data point should share the same labels as its nearest neighbors, while data points of different labels should be far from the given point. The term target neighbor refers to a point that should be similar while an impostor is a point that is a nearest neighbor but has a different label. The goal of LMNN is to minimize the number of impostors via the relative distance constraints.

ITML minimizes the differential relative entropy between two multivariate Gaussians under constraints on the distance function. This problem can be formulated into a Bregman optimization problem by minimizing the LogDet divergence subject to linear constraints. This algorithm can handle a variety of constraints and can optionally incorporate a prior on the distance function. ITML does not rely on an eigen-value computation or semi-definite programming.

MMC minimizes the sum of squared distances between similar data points, while making sure the sum of distances between dissimilar examples to be greater than a certain margin. This leads to a convex and local-minima-free optimization problem that can be solved efficiently.

Other metric learning algorithms can also be utilized. The metric learning algorithms can be utilized to construct task-specific distance functions. These distance functions are constructed such that attributes affecting the targeted use are assigned greater weights when calculating the distance metrics and attributes not affecting the targeted use are assigned smaller weights. The metric learning algorithms obtain these distance functions through, for example, supervised or semi-supervised learning. The obtained distance functions form the data transformation model 312.

In other scenarios where the targeted use of the aggregated data 122 is unknown or where the metric learning method is ineffective, other data transformation methods can be utilized to generate the data transformation model 312, such as the principal component analysis (PCA), the locally linear embedding (LLE) transformation, or Kernel-based nonlinear transformation. For instance, the PCA can generate a transformation function (used as the data transformation model 312) to transform the attributes to values represented in terms of the principal components of the attributes. In other examples, no transformation is applied and thus the data transformation model 312 is an identity transformation model.

In some implementations, the data transformation module 302 selects a subset of the sensitive data 114 to determine the data transformation model 312. Selecting this subset can reduce computational complexity. The subset of the sensitive data 114 can be determined using balanced sampling. For example, if the targeted use is to identify consumers who are likely to open a bank card in the next three months, the data transformation module 302 can generate balanced sensitive data records so that a portion of the data records involves consumers opening a bank card in the next three months and the other portion of the data records involves consumers who do not open a bank card. Alternatively, or additionally, the subset of the sensitive data 114 are selected randomly from the sensitive data 114.

In some examples, the data transformation module 302 selects a subset of the attributes of the sensitive data 114 to determine the data transformation model 312. Selecting this subset can further reduce computational complexity. The subset of the attributes includes the sensitive data attributes, such as the regulated information, and some other non-sensitive data attributes that are useful in segmenting the sensitive data 114. The remaining data attributes can be omitted in the process of determining the data transformation model 312 and the segmentation process described in the following. In some implementations, selecting the data attributes can be implemented using multiple variable selection methods, such as correlated independent variable screening and Gradient Boosting Machine Variable Reduction methods.

The data transformation module 302 further applies the generated data transformation model 312 on the sensitive data 114 to generate the transformed sensitive data, also referred to as transformed data 308.

Referring back to FIG. 2, at block 206, the process 200 involves compressing the sensitive database by grouping transformed data records into data segments. The grouping or segmenting is performed such that sensitive data in the same segment have similar attributes and performance, and sensitive data in different segments have dissimilar attributes and performance. In some examples, the data aggregation subsystem 107 employs a data segmentation module 304 to perform the grouping or segmentation as shown in FIG. 3. The data segmentation module 304 employs one or more data segmentation models 314 to perform the segmentation.

In one example, the data segmentation models 314 is a bin-based segmentation model. In this model, the transformed data 308 are grouped into segments based on the predicted outcome performance of each transformed data record. To determine the outcome performance of the transformed data records, a machine learning model is built and utilized to predict a probability of the prediction outcome associated with each transformed data record. These probabilities are sorted, based on which the associated transformed data records are grouped into multiple bins, each bin representing one segment.

In another example, the data segmentation model 314 is a cluster-based segmentation model, where the transformed data records are clustered into K groups using a clustering algorithm. Sensitive data records in each of the K groups form one segment and the K groups result in K data segments. In yet another example, the data segmentation model 314 is a neighborhood-based segmentation model. In this model, the transformed sensitive data records are grouped around a set of given data records. Neighbors near each of the given data records form one data segment. Additional examples of applying the data segmentation models 314 to segment the sensitive data 114 are provided below with regard to FIG. 4. Based on the data segments, the data segmentation module 304 generates segmented data 310 by grouping the sensitive data 114 into segments according to the data segments determined using the data segmentation model 314.

Referring back to FIG. 2, at block 208, the process 200 involves generating aggregated data 122 by removing sensitive information from the sensitive data records 114. In one example, the data aggregation subsystem 107 employs a data aggregation module 306 to generate the aggregated data 122 based on the segmented data 310 as shown in FIG. 3. For example, the data aggregation module 306 removes the sensitive information by calculating statistics for each attribute of the sensitive data records contained in a data segment. The calculated statistics are stored in an aggregated data record as obfuscated attributes. The statistics can include maximum, minimum, mean, median, or other statistics of the values of the sensitive attributes. In this way, the individual values of the attributes of the sensitive data records are not revealed in the aggregated data 122. Note that in some aspects, the data transformation and the data segmentation described with regard to blocks 206 and 208 may be performed based on selected attributes of the sensitive data 114. Aggregating the sensitive data 114, on the other hand, may be applied to all the attributes of the sensitive data 114. As such, in some examples, the data aggregation module 306 calculates the statistics for all the attributes of the sensitive data 114.

Referring back to FIG. 2, at block 210, the process 200 involves providing the aggregated data 122 for access by the requesting entity. For example, the data protection system 100 can identify the requested data from the aggregated data 122 and send the aggregated data back to the client computing device associated with the requesting entity. If the data request includes a search query, the data protection system 100 can perform the search within the aggregated data 122 to identify data records that match the search query and return the search results to the client computing device.

In various aspects, block 202 and blocks 204-208 can be performed in the order depicted in FIG. 2, could be performed in parallel, or could be performed in some other order (e.g., blocks 204-208 being performed before block 202). For example, the data aggregation subsystem 107 can perform the data transformation and aggregation as described with regard to blocks 204-208 before receiving a request for data. The data transformation and aggregation can be performed for several pre-determined targeted uses and the respective aggregated data 122 can be stored in the data storage 111. When a request for data for a specific targeted use is received, the data aggregation subsystem 107 identifies and provides the corresponding aggregated data 122 for access by the request entity and its associated computing devices.

In another example, the aggregated data 122 is pre-generated using a transformation model and a data segmentation model without considering a targeted use. For instance, a transformation model that does not involve the targeted use, such as the PCA, LLE, or even identify transformation, can be utilized to transform the sensitive data 114. A data segmentation model that does not rely on the knowledge of the targeted use, such as the cluster-based segmentation model, can be utilized for data segmentation and aggregation. As a result, the generated aggregated data 122 are not specific to any targeted use and can be utilized to satisfy a request for data received after the aggregated data 122 is generated.

FIG. 4 is a flowchart showing an example of a process 400 for generating data segments for the sensitive data 114, according to certain aspects of the present disclosure. One or more computing devices (e.g., the data protection system 100, or more specifically, the data aggregation computing system 106) implement operations depicted in FIG. 4 by executing suitable program code (e.g., the program code for the data aggregation subsystem 107).

At block 402, the process 400 involves obtaining transformed sensitive data 308. The transformed sensitive data 308 may be received from the data transformation module 302. In some examples, the transformed sensitive data 308 only contains selected attributes to reduce the computational complexity of the process.

At block 404, the process 400 involves selecting a data segmentation model 314 from available segmentation models including, but not limited to, a bin-based segmentation model, a cluster-based segmentation model, and a neighborhood-based segmentation model. The selection may be made based on explicit input from the client computing device 102 or based on analysis of the data request or other requirements associated with the data aggregation process. For example, the bin-based segmentation model can be selected if the data requesting entity specifies a targeted use of the aggregated data 122 and the associated performance indicator, such as the likelihood of a consumer applying for an auto loan in the next six months. The cluster-based segmentation model can be selected if the requesting entity requested the data for generic use and does not specify any specific targeted use of the aggregated data 122. The neighborhood-based segmentation model can be selected if the requesting entity has specified a list of data records for which the aggregated data attributes are to be obtained.

In addition, different segmentation models involve different computational complexities. Selecting the data segmentation models 314 can also be performed based on the available computing resources at the data protection system 100 and the desired response speed to the data request. Relatively speaking, creating the bin-based segmentation model consumes fewer computational resources and can be used to deliver the aggregated data 122 faster than other models. The cluster-based segmentation model consumes more computational resources in building the model, but once the model is built, it can be used to deliver the aggregated data 122 with low latency. The neighborhood-based segmentation model involves intermediate computational resource consumption and response speed.

If the bin-based segmentation model is selected, the process 400 involves, at block 412, determining a subset of the transformed data 308 as the training data of a machine learning model for the targeted use of the aggregated data 122. The subset of the data can be the same subset of the data used for calculating the data transformation model 312 discussed above with regard to block 204 of FIG. 2. A different subset of the data can also be selected. Each record in the selected subset of data contains the data attributes and the corresponding outcome of the targeted use. For example, if the targeted use of the aggregated data 122 is to predict the likelihood of a consumer opening a bank card in the next three months, each record in the selected subset of data includes the attributes of a consumer at a time point, such as the consumer's income, credit score, debt, etc. at that time point. The data record also includes the corresponding outcome, i.e. the consumer opened or did not open a bankcard within 3 months from that time point.

At block 414, the process 400 involves training a machine learning model configured to predict the outcome of the targeted use based on the attributes of the data records. For example, the machine learning model can include a gradient boosting tree (GBT) model or any other model that can be utilized for supervised learning and prediction including neural networks. GBT is a supervised machine learning algorithm for classification problems and it combines multiple weak classifiers (such as decision trees) to create a strong classifier iteratively. GBT achieves higher performance through a sequential training process, where each new decision tree is trained on a weighted version of the original data. In each iteration, the original data are weighted such that the weights of those observations that are difficult to classify are increased, whereas the weights of those observations that are easy to classify are decreased. Training the machine learning model can be performed based on the selected data records obtained at block 412.

At block 416, the process 400 involves applying the trained model to the transformed data 308 to determine the probability of the outcome associated with each of the records in the transformed data 308 (and thus each record in the sensitive data 114).

At block 418, the process 400 involves sorting the probabilities associated with the data records in the transformed data 308 in descending order or ascending order. Based on the sorted probabilities, the data segmentation module 304 bins or groups adjacent data records into one bin so that each bin contains Q data records. In some examples, Q is set to 7. Other values of Q may also be utilized. If the last bin contains less than Q data records, the data segmentation module 304 adds these data records into the second to the last bin so that every bin contains no less than Q data records. The data segmentation module 304 generates the data segments by determining that the data records contained in each bin belong to a data segment. As a result, the data segmentation module 304 generates $\lfloor N/Q \rfloor$ bins or segments, where $\lfloor x \rfloor$ represents the floor of x. Although in this example, the number of records in each bin or segment is the same, different bins/segments may contain different numbers of data records.

If the cluster-based segmentation model is selected, the process 400 involves, at block 422, selecting a set of cluster centroids for the clustering algorithm, such as the K-means clustering algorithm. The initial K cluster centroids can be selected randomly or generated using other initialization methods from the transformed data records 308. At block 424, the process 400 involves applying the clustering algorithm on the transformed data 308 based on the K cluster centroids. In one implementation, the clustering algorithm is the same-size K-mean clustering algorithm. Other clustering algorithms can also be utilized. The results of the clustering algorithm are K clusters wherein each cluster contains the same number of data records, i.e. $\lfloor N/K \rfloor$ if the same-size K-mean clustering is used. The value K can be adjusted to change the number of data records contained in each cluster. For example, the data segmentation module 304 can generate clusters each containing Q records by selecting $K=\lfloor N/Q \rfloor$. If there is a cluster containing less than Q records, those records can be merged into the closest cluster. Q can be set to 7 or any other number. At block 426, the data segmentation module 304 generates the data segments by determining that the data records contained in each cluster belong to a data segment.

If the neighborhood-based segmentation model is selected, the process 400 involves, at block 432, accessing a list of requested records. The list of requested records may be specified by the requesting entity. For example, the requesting entity may specify the requested records by specifying a list of data records for which the aggregated data attributes are to be obtained. The request contains an identifier for each of the requested data record so that the data segmentation module 304 can identify the corresponding requested data record in the transformed data 308. At block 434, the data segmentation module 304 determines Q–1 nearest neighbors of each of the requested data records. For each requested data record, its Q–1 nearest neighbors along with the requested data record itself form a neighborhood containing Q data records. In this way, L neighborhoods are generated, where L is the number of requested data records. At block 436, the data segmentation module 304 generates the data segments by determining that the data records contained in each neighborhood belong to a data segment.

Note that in the above three types of data segmentation models 314, the data segments generated by using the bin-based segmentation model and the cluster-based segmentation model do not overlap. In other words, the data records in one segment do not belong to another data segment. The data segments generated by the neighborhood-based segmentation model, however, may overlap such that one data record may be contained in more than one data segment.

Computer System Example

Figure 5:
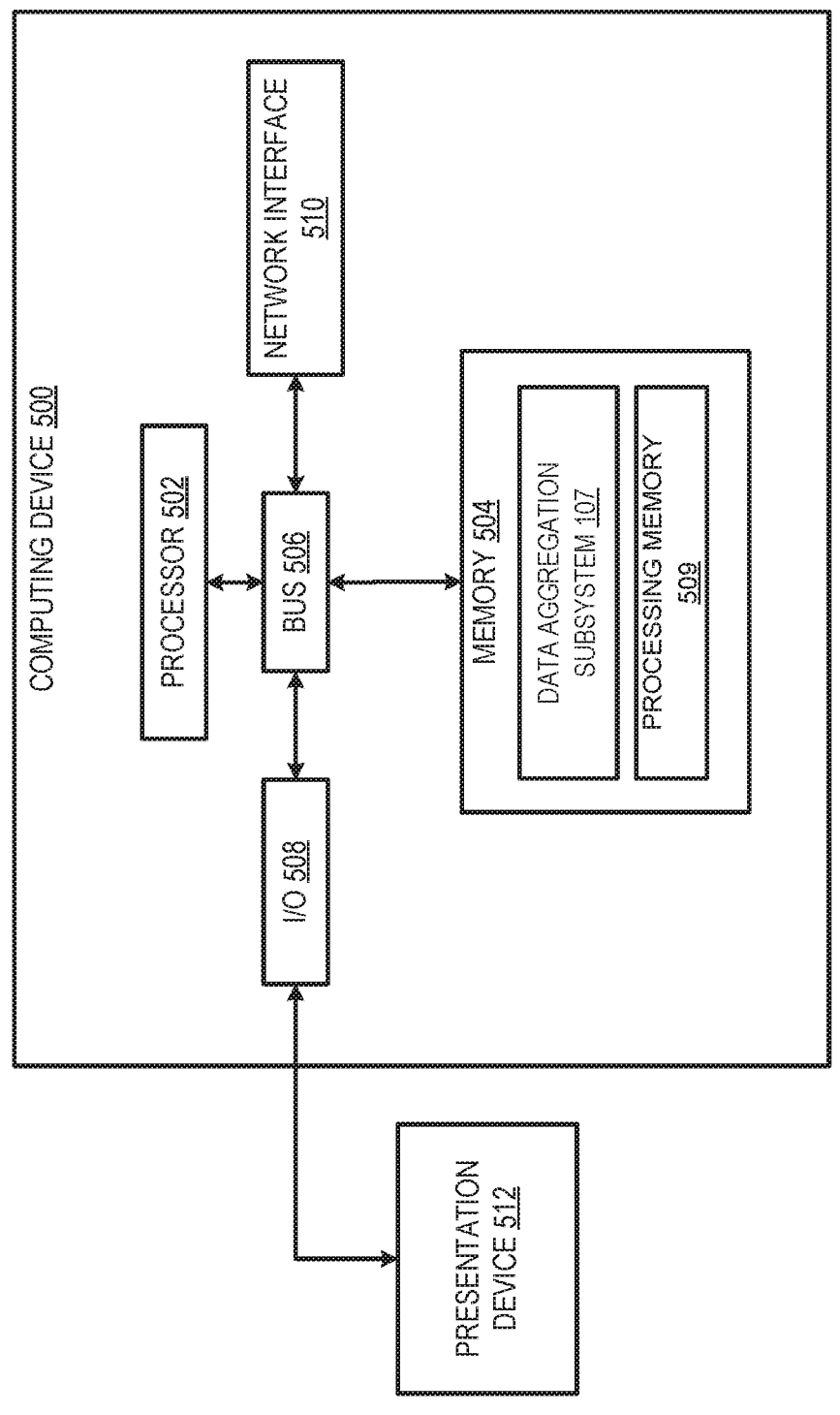
FIG. 5 is a block diagram depicting an example of a computing system suitable for implementing aspects of the techniques and technologies presented herein.

Any suitable computing system or group of computing systems can be used to perform the data obfuscation operations described herein. For example, FIG. 5 is a block diagram depicting an example of a computing device 500 that can be utilized to implement the data aggregation computing system 106. The example of the computing device 500 can include various devices for communicating with other devices in the system 100, as described with respect to FIG. 1. The computing device 500 can include various devices for performing one or more of the operations described above with respect to FIGS. 1-4.

The computing device 500 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices. The processor 502 can include or communicate with a memory 504. The memory 504 stores program code that, when executed by the processor 502, causes the processor to perform the operations described in this disclosure.

The memory 504 can include any suitable non-transitory computer-readable storage medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The computing device 500 may also include a number of external or internal devices such as input or output devices. For example, the computing device 500 is shown with an input/output interface 508 that can receive input from input devices or provide output to output devices. A bus 506 can also be included in the computing device 500. The bus 506 can communicatively couple one or more components of the computing device 500.

The computing device 500 can execute program code that includes one or more of the data aggregation subsystem 107. The program code for this module may be resident in any suitable computer-readable medium and may be executed on any suitable processing device. For example, as depicted in FIG. 5, the program code for the data aggregation subsystem 107 can reside in the memory 504 at the computing device 500. Executing this module can configure the processor 502 to perform the operations described herein. The data aggregation subsystem 107 can make use of processing memory 509 that is part of the memory of computing device 500.

In some aspects, the computing device 500 can include one or more output devices. One example of an output device is the network interface device 510 depicted in FIG. 5. A network interface device 510 can include any device or group of devices suitable for establishing a wired or wireless data connection to one or more data networks 104. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," and "determining" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method that includes one or more processing devices performing operations comprising:

receiving a query, from a client computing device, for a sensitive database that the client computing device is unauthorized to access, the sensitive database comprising a plurality of sensitive data records, each sensitive data record containing at least one sensitive attribute that forms a set of sensitive attributes;

determining a data transformation model configured to transform sensitive data records from a first space defined using a first type of distance to a second space defined using a second type of distance;

transforming the plurality of sensitive data records using the determined data transformation model generated based on the sensitive data records;

grouping, by executing a data segmentation model selected from a set of available segmentation models based at least in part on the query from the client computing device, the transformed sensitive data records into a plurality of aggregation segments based on the transformed sensitive data records, wherein each of the plurality of aggregation segments contains multiple transformed sensitive data records;

generating aggregated data by calculating statistics for the at least one sensitive attribute contained in the multiple transformed sensitive data records in each of the aggregation segments, the calculated statistics included in the aggregated data as an obfuscated attribute to replace a respective individual value of the at least one sensitive attribute; and causing the aggregated data to be accessible by the client computing device.

2. The method of claim 1, wherein the data transformation model is generated by applying metric learning on a subset of the sensitive data records, and wherein the metric learning is performed through one or more of large margin nearest neighbor (LMNN), information theoretic metric learning (ITML), or Mahalanobis metric for clustering (MMC).

3. The method of claim 2, wherein the query specifies a targeted use of the aggregated data, and wherein the data transformation model is further generated based on the targeted use such that each sensitive attribute affecting a performance indicator of the targeted use is respectively assigned a higher weight than a remaining subset of the set of sensitive attributes.

4. The method of claim 1, wherein grouping the sensitive data records into the plurality of aggregation segments comprises:

generating the data segmentation model by training a machine learning model using a subset of the transformed sensitive data records, the machine learning model is configured to predict a probability of a prediction outcome of a targeted use of the aggregated data;

applying the machine learning model to the transformed sensitive data records to generate a probability associated with each of the transformed sensitive data records;

sorting the transformed sensitive data records according to the probabilities associated with the transformed sensitive data records; and generating the plurality of aggregation segments by grouping adjacent ones of the sorted transformed sensitive data records into one segment.

5. The method of claim 1, wherein grouping the sensitive data records into the plurality of aggregation segments comprises:

selecting a plurality of cluster centroids, wherein a number of the cluster centroids is the same as a number of the plurality of aggregation segments;

applying a clustering algorithm on the transformed sensitive data records based on the plurality of cluster centroids to generate a plurality of clusters; and generating the plurality of aggregation segments by grouping transformed sensitive data records according to the plurality of clusters.

6. The method of claim 1, wherein grouping the sensitive data records into the plurality of aggregation segments comprises:

receiving a list of requested records;

identifying requested transformed sensitive data records corresponding to the list of requested records;

determining a plurality of neighbors for each of the requested transformed sensitive data records; and generating the plurality of aggregation segments by grouping the plurality of neighbors for each of the requested transformed sensitive data records into one aggregation segment.

7. The method of claim 1, further comprising:

encrypting the sensitive data records;

storing the encrypted sensitive data records in a secured storage device; and prior to transforming the sensitive data records, retrieving and decrypting the encrypted sensitive data records to generate the plurality of sensitive data records.

8. A system comprising:

a processor; and a non-transitory computer-readable storage device comprising instructions that are executable by the processor to cause the system to perform operations comprising:

receiving a query, from a client computing device, for a sensitive database that the client computing device is unauthorized to access, the sensitive database comprising a plurality of sensitive data records, each sensitive data record containing at least one sensitive attribute that forms a set of sensitive attributes;

determining a data transformation model configured to transform sensitive data records from a first space defined using a first type of distance to a second space defined using a second type of distance;

transforming the plurality of sensitive data records using the determined data transformation model generated based on the sensitive data records;

grouping, by executing a data segmentation model selected from a set of available segmentation models based at least in part on the query from the client computing device, the transformed sensitive data records into a plurality of aggregation segments based on the transformed sensitive data records, wherein each of the plurality of aggregation segments contains multiple transformed sensitive data records;

generating aggregated data by calculating statistics for the at least one sensitive attribute contained in the multiple transformed sensitive data records in each of the aggregation segments, the calculated statistics included in the aggregated data as an obfuscated attribute to replace a respective individual value of the at least one sensitive attribute; and causing the aggregated data to be accessible by the client computing device.

9. The system of claim 8, wherein the data transformation model is generated by applying metric learning on a subset of the sensitive data records.

10. The system of claim 9, wherein the metric learning is performed through one or more of large margin nearest neighbor (LMNN), information theoretic metric learning (ITML), or Mahalanobis metric for clustering (MMC).

11. The system of claim 8, wherein grouping the sensitive data records into the plurality of aggregation segments comprises:

generating the data segmentation model by training a machine learning model using a subset of the transformed sensitive data records, the machine learning model is configured to predict a probability of a prediction outcome of a targeted use of the aggregated data;

applying the machine learning model to the transformed sensitive data records to generate a probability associated with each of the transformed sensitive data records;

sorting the transformed sensitive data records according to the probabilities associated with the transformed sensitive data records; and

generating the plurality of aggregation segments by grouping adjacent ones of the sorted transformed sensitive data records into one segment.

12. The system of claim 8, wherein grouping the sensitive data records into the plurality of aggregation segments comprises:

selecting a plurality of cluster centroids, wherein a number of the cluster centroids is the same as a number of the plurality of aggregation segments;

applying a clustering algorithm on the transformed sensitive data records based on the plurality of cluster centroids to generate a plurality of clusters; and generating the plurality of aggregation segments by grouping transformed sensitive data records according to the plurality of clusters.

13. The system of claim 8, wherein grouping the sensitive data records into the plurality of aggregation segments comprises:

receiving a list of requested records;

identifying requested transformed sensitive data records corresponding to the list of requested records;

determining a plurality of neighbors for each of the requested transformed sensitive data records; and generating the plurality of aggregation segments by grouping the plurality of neighbors for each of the requested transformed sensitive data records into one aggregation segment.

14. The system of claim 8, wherein the query specifies a targeted use of the aggregated data, and wherein the data transformation model is further generated based on the targeted use such that each sensitive attribute affecting a performance indicator of the targeted use is respectively assigned a higher weight than a remaining subset of the set of sensitive attributes.

15. A non-transitory computer-readable storage medium having program code that is executable by a processor device to cause a computing device to perform operations, the operations comprising:

receiving a query, from a client computing device, for a sensitive database that the client computing device is unauthorized to access, the sensitive database comprising a plurality of sensitive data records, each sensitive data record containing at least one sensitive attribute that forms a set of sensitive attributes;

determining a data transformation model configured to transform sensitive data records from a first space defined using a first type of distance to a second space defined using a second type of distance;

transforming the plurality of sensitive data records using the determined data transformation model generated based on the sensitive data records;

grouping, by executing a data segmentation model selected from a set of available segmentation models based at least in part on the query from the client computing device, the transformed sensitive data records into a plurality of aggregation segments based on the transformed sensitive data records, wherein each of the plurality of aggregation segments contains multiple transformed sensitive data records;

generating aggregated data by calculating statistics for the at least one sensitive attribute contained in the multiple transformed sensitive data records in each of the aggregation segments, the calculated statistics included in the aggregated data as an obfuscated attribute to replace a respective individual value of the at least one sensitive attribute; and causing the aggregated data to be accessible by the client computing device.

16. The non-transitory computer-readable storage medium of claim 15, wherein the query specifies a targeted use of the aggregated data, and wherein the data transformation model is further generated based on the targeted use such that each sensitive attribute affecting a performance indicator of the targeted use is respectively assigned a higher weight than a remaining subset of the set of sensitive attributes.

17. The non-transitory computer-readable storage medium of claim 15, wherein grouping the sensitive data records into the plurality of aggregation segments comprises:

generating the data segmentation model by training a machine learning model using a subset of the transformed sensitive data records, the machine learning model is configured to predict a probability of a prediction outcome of a targeted use of the aggregated data;

applying the machine learning model to the transformed sensitive data records to generate a probability associated with each of the transformed sensitive data records;

sorting the transformed sensitive data records according to the probabilities associated with the transformed sensitive data records; and generating the plurality of aggregation segments by grouping adjacent ones of the sorted transformed sensitive data records into one segment.

18. The non-transitory computer-readable storage medium of claim 15, wherein grouping the sensitive data records into the plurality of aggregation segments comprises:

selecting a plurality of cluster centroids, wherein a number of the cluster centroids is the same as a number of the plurality of aggregation segments;

applying a clustering algorithm on the transformed sensitive data records based on the plurality of cluster centroids to generate a plurality of clusters; and generating the plurality of aggregation segments by grouping transformed sensitive data records according to the plurality of clusters.

19. The non-transitory computer-readable storage medium of claim 15, wherein grouping the sensitive data records into the plurality of aggregation segments comprises:

receiving a list of requested records;

identifying requested transformed sensitive data records corresponding to the list of requested records;

determining a plurality of neighbors for each of the requested transformed sensitive data records; and generating the plurality of aggregation segments by grouping the plurality of neighbors for each of the requested transformed sensitive data records into one aggregation segment.

20. The non-transitory computer-readable storage medium of claim 15, wherein the data transformation model is generated by applying metric learning on a subset of the sensitive data records.

* * * * *